US006947225B2

(12) United States Patent
Sekiguchi et al.

(10) Patent No.: US 6,947,225 B2
(45) Date of Patent: Sep. 20, 2005

(54) FRESNEL LENS SHEET, PROCESS OF PRODUCING FRESNEL LENS SHEET, MOLD FOR USE IN THE PRODUCTION PROCESS, AND REAR PROJECTION SCREEN COMPRISING THE FRESNEL LENS SHEET

(75) Inventors: Hiroshi Sekiguchi, Tokyo-To (JP); Yoshiki Yoshida, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/748,671

(22) Filed: Dec. 31, 2003

(65) Prior Publication Data

US 2004/0160681 A1 Aug. 19, 2004

(30) Foreign Application Priority Data

Jan. 7, 2003 (JP) ........................................ 2003-001047

(51) Int. Cl.[7] .............................. G02B 3/08; G03B 21/56
(52) U.S. Cl. .................... 359/742; 359/743; 359/460
(58) Field of Search ................................ 359/742, 743, 359/457, 459, 460

(56) References Cited

U.S. PATENT DOCUMENTS 4,919,518 A * 4/1990 Ogino et al. ............... 359/457
5,398,137 A * 3/1995 Ishikawa et al. ............ 359/742
6,252,724 B1 * 6/2001 Scheer ....................... 359/723

FOREIGN PATENT DOCUMENTS

JP           61-208041          9/1986

* cited by examiner

Primary Examiner—Georgia Epps
Assistant Examiner—M. Hasan
(74) Attorney, Agent, or Firm—Oliff & Berridge, PLC

(57) ABSTRACT

The present invention provides a Fresnel lens sheet that can, in production using a mold, be easily released from the mold and that scarcely produces stray light upon use, and others. Each prism 2 on the incident side of a Fresnel lens sheet 1 is formed to have a nearly triangular cross section and has a plane of refraction 3 that refracts projected light S incident on this plane and a plane of total reflection 4 that totally reflects, toward the viewer's side, at least part of the light refracted at the plane of refraction 3. Each prism 2 is made so that a root 5 between a prism 2 and a prism 3 situated next to the prism 2, on the plane of total reflection side of the prism 2 (a root 5 defined by the plane of refraction 3 of one prism 2B and the plane of total reflection 4 of another prism 2A situated next to the prism 2B, on the side of the plane of refraction 3 of the prism 2B) is curved toward the prism 2A side from the prism 2B side.

6 Claims, 17 Drawing Sheets

FRESNEL LENS SHEET, PROCESS OF PRODUCING FRESNEL LENS SHEET, MOLD FOR USE IN THE PRODUCTION PROCESS, AND REAR PROJECTION SCREEN COMPRISING THE FRESNEL LENS SHEET

BACKGROUND OF THE INVENTION

1. Field of the Invention

The present invention relates to a Fresnel lens sheet for use in a rear projection type television, especially a Fresnel lens sheet suitable for condensing light obliquely projected from a projector (light source) placed at its rear to let the light emerge toward the viewer's side as nearly parallel rays. In addition, the present invention relates to a process of producing the Fresnel lens sheet, to a mold for use in this production process, and to a rear projection screen comprising the Fresnel lens sheet.

2. Description of the Related Art

There has conventionally been known, as a large-size-screen television, a rear projection type television in which light, imaging light, is projected on a rear projection screen from a projector placed at the rear of the rear projection screen to display an image to viewers.

In such a rear projection type television, light projected from a projector is spread and the spread light is projected on a rear projection screen, so that it is necessary to keep a certain distance between the projector and the rear projection screen. A television of this type therefore has had the problem that the space in the direction of depth is apt to be large.

To solve this problem, there has been proposed a rear projection type television in which a projector 30 is, as shown in FIG. 17, placed obliquely below a rear projection screen 21' at its rear, and light S is projected on the rear projection screen 21' obliquely and upwardly from this projector 30 in order to make the space in the direction of depth smaller.

A rear projection screen comprising a total reflection Fresnel lens that can condense light projected obliquely from its rear (Japanese Laid-Open Patent Publication No. 208041/1986) is conveniently used as the rear projection screen 21' for use in the rear projection type television as shown in FIG. 17. The total reflection Fresnel lens herein denotes a lens having a plurality of prisms, where projected light is refracted at the first plane (plane of refraction) of each prism and then totally reflected at the second plane (plane of total reflection) of each prism to emerge toward the viewer's side.

In a rear projection screen comprising such a total reflection Fresnel lens, the light path of projected light is corrected by totally reflecting the projected light. Therefore, the rear projection screen can attain high transmittance even when projected light is obliquely incident on the rear projection screen at a large angle.

In a Fresnel lens sheet having such a total reflection Fresnel lens, since light is obliquely projected on the Fresnel lens sheet as described above, the angle of incidence at which projected light is incident on the Fresnel lens sheet is usually in the order of 35 to 75°. A resin material with a refractive index of approximately 1.45 to 1.65 is usually used as a molding material for the Fresnel lens sheet. In this case, each prism on the Fresnel lens sheet has an apical angle $\alpha$ of approximately 30 to 40°, an angle of the plane of refraction $\gamma$ of approximately 78 to 90°, and an angle of the plane of total reflection $\beta$ of approximately 65 to 50° (where $\alpha+\beta+\gamma=180°$) (see FIG. 18).

In such a Fresnel lens sheet, the angle $\delta$ of a root between two neighboring prisms is nearly equal to the apical angle $\alpha$ of each prism. Therefore, also the apical angle $\omega$ of an angular protrusion created between two neighboring molding grooves C in a mold D for use in the molding of the Fresnel lens sheet is equal to the apical angle $\alpha$ of each prism and is as considerably sharp as approximately 30 to 40° (see FIG. 18). For this reason, the tips of the angular protrusions of the mold D easily bend and also often get curved toward the counter-light-source side as, for example, shown in FIG. 19, so that the problems as described below used to occur.

In this Specification, "the light-source side of a mold" means, in a mold for use in the molding of a Fresnel lens sheet, the side with which a portion of the Fresnel lens sheet to be situated on the side close to a light source upon use of the Fresnel lens sheet is molded, while "the counter-light-source side of a mold" means the side with which a portion of the Fresnel lens sheet to be situated on the side distant from the light source upon use of the Fresnel lens sheet is molded. More specifically, if each prism on a Fresnel lens sheet that will be obtained by molding using the mold is considered, "the light-source side of a mold" refers to the side with which the plane of refraction of each prism is molded, while "the counter-light-source side of a mold" refers to the side with which the plane of total reflection of each prism is molded. In FIG. 19, the plane Ca, on the lower side in the figure, of each molding groove C in the mold D forms the plane of refraction of each prism, and the plane Cb, on the upper side in the figure, of the molding groove C in the mold D forms the plane of total reflection of each prism, so that the lower side in the figure is the light-source side of the mold D and that the upper side in the figure is the counter-light-source side of the mold D.

The problems that occur when a Fresnel lens sheet is molded by the use of the mold D shown in FIG. 19 will be described hereinafter.

(1) Problems in the Production of Fresnel Lens Sheet

In the molding of a Fresnel lens sheet using the mold D shown in FIG. 19, after loading a resin in the mold D and curing this resin, the Fresnel lens sheet 11, molded product, is released from the mold D. At this time, since the tips of the angular protrusions of the mold D cut into the Fresnel lens sheet 11, it has been difficult to release the Fresnel lens sheet 11 from the mold D (see FIG. 20A). Moreover, in this condition, if it is tried to release the Fresnel lens sheet 11 from the mold D by force, the Fresnel lens sheet 11 has been damaged sometimes.

(2) Problems upon Use of Fresnel Lens Sheet

The curves of the angular protrusions of the mold D are transferred to the Fresnel lens sheet 11 when the Fresnel lens sheet 11 is molded by the use of the mold D shown in FIG. 19, so that each root 15 between two neighboring prisms 12 among a plurality of the prisms 12 situated on the incident side of a base 11a gets curved as shown in FIG. 20B. When light S is obliquely projected on the Fresnel lens sheet 11 in which the roots 15 between each two neighboring prisms 12 are curved in this way, part of light totally reflected from the plane of total reflection 14 of each prism 12 is reflected again at the curved root 15 (a curved portion of the plane of refraction 13 of the root 15) to become stray light Y. The stray light Y thus produced is reflected at the plane of emergence 11b and then returns to the incident side via the base 11a, and this light is refracted or reflected again at the plane of refraction 13 or the plane of total reflection 14 of each prism 12 to emerge in late from the position on the plane of emergence 11b that is different from the position of normal emergence. This causes such troubles as the occurrence of double image.

SUMMARY OF THE INVENTION

We made earnest studies in order to solve the above-described problems, and, as a result, found that it is possible to control the curves of the tips of the angular protrusions of a mold and that a Fresnel lens sheet having advantageous effects on the above-described problems can be obtained if a mold in a specific shape made under this control is used.

The present invention has been accomplished on the basis of the above findings. Objects of the present invention are to provide a Fresnel lens sheet that can, in production using a mold, be easily released from the mold and that scarcely produces stray light upon use; a process of producing the Fresnel lens sheet; a mold for use in this production process; and a rear projection screen comprising the Fresnel lens sheet.

The present invention provides, as a first aspect for fulfilling the object of the present invention, a Fresnel lens sheet that condenses imaging light obliquely projected from a projector to let the light emerge toward the viewer's side as nearly parallel rays, comprising: a base in sheet form; and a plurality of prisms formed on the incident side of the base, each of the prisms having a plane of refraction that refracts projected light and a plane of total reflection that totally reflects, toward the viewer's side, at least part of the light refracted at the plane of refraction, wherein each root defined by the plane of refraction of one prism among a plurality of the prisms and the plane of total reflection of another prism, the another prism being situated next to the one prism on the side of the plane of refraction of the one prism, is curved toward the another prism side from the one prism side.

In the above-described first aspect for fulfilling the object of the invention, it is preferable that, in the cross section of each of the prisms vertical to its edge, the distance of shift, due to curve, of the end of the root be not more than 20% (more preferably not more than 15%) of the prism pitch.

Further, in the above-described first aspect for fulfilling the object of the invention, it is preferable that, in the cross section of each of the prisms vertical to its edge, the length of the curved portion of the plane of refraction of the root and that of the curved portion of the plane of total reflection of the root be not more than 40% (more preferably not more than 30%) of the total length of the plane of refraction and of the total length of the plane of total reflection, respectively.

The present invention provides, as a second aspect for fulfilling the object of the present invention, a process of producing a Fresnel lens sheet having a plurality of prisms formed on its incident side, each of the prisms having a plane of refraction that refracts projected light and a plane of total reflection that totally reflects, toward the viewer's side, at least part of the light refracted at the plane of refraction, comprising the steps of: making a mold for use in the molding of the Fresnel lens sheet; loading a resin in the mold and curing this resin; and releasing, from the mold, the resin that has been loaded in the mold, wherein, in the step of making the mold, molding grooves are successively cut in a mold material, from a molding groove that corresponds to the prism to be situated on the side close to a light source upon use of the Fresnel lens sheet, to a molding groove that corresponds to the prism to be situated on the side distant from the light source upon use of the Fresnel lens sheet.

The present invention provides, as a third aspect for fulfilling the object of the present invention, a process of producing a Fresnel lens sheet having a plurality of prisms formed on its incident side, each of the prisms having a plane of refraction that refracts projected light and a plane of total reflection that totally reflects, toward the viewer's side, at least part of the light refracted at the plane of refraction, comprising the steps of: making a master mold that is the original of a mold for use in the molding of the Fresnel lens sheet; reproducing a mold from the master mold; loading a resin in the reproduced mold and curing this resin; and releasing, from the mold, the resin that has been loaded in the mold, wherein, in the step of making the master mold, molding grooves are successively cut in a material for the master aspect, from a molding groove that corresponds to the prism to be situated on the side close to a light source upon use of the Fresnel lens sheet, to a molding groove that corresponds to the prism to be situated on the side distant from the light source upon use of the Fresnel lens sheet.

The present invention provides, as a fourth aspect for fulfilling the object of the present invention, a mold for use in the molding of a Fresnel lens sheet having a plurality of prisms formed on its incident side, each of the prisms having a plane of refraction that refracts projected light and a plane of total reflection that totally reflects, toward the viewer's side, at least part of the light refracted at the plane of refraction, wherein the mold is made by successively cutting molding grooves in a mold material, from a molding groove that corresponds to the prism to be situated on the side close to a light source upon use of the Fresnel lens sheet, to a molding groove that corresponds to the prism to be situated on the side distant from the light source upon use of the Fresnel lens sheet, and each angular protrusion created between two neighboring molding grooves is curved toward the molding groove that corresponds to the prism to be situated on the side close to the light source upon use of the Fresnel lens sheet, from the direction of the molding groove that corresponds to the prism to be situated on the side distant from the light source upon use of the Fresnel lens sheet.

The present invention provides, as a fifth aspect for fulfilling the object of the present invention, a master mold that is the original of a mold for use in the molding of a Fresnel lens sheet having a plurality of prisms formed on its incident side, each of the prisms having a plane of refraction that refracts projected light and a plane of total reflection that totally reflects, toward the viewer's side, at least part of the light refracted at the plane of refraction, wherein the master mold is made by successively cutting molding grooves in a material for the master mold, from a molding groove that corresponds to the prism to be situated on the side close to a light source upon use of the Fresnel lens sheet, to a molding groove that corresponds to the prism to be situated on the side distant from the light source upon use of the Fresnel lens sheet, and each angular protrusion created between two neighboring molding grooves is curved toward the molding groove that corresponds to the prism to be situated on the side close to the light source upon use of the Fresnel lens sheet, from the direction of the molding groove that corresponds to the prism to be situated on the side distant from the light source upon use of the Fresnel lens sheet.

The present invention provides, as a sixth aspect for fulfilling the object of the present invention, a rear projection screen comprising a Fresnel lens sheet according to the above-described first aspect for fulfilling the object of the invention; and a light-diffusing sheet (a lenticular lens sheet, or the like) placed on the viewer's side of the Fresnel lens sheet.

According to the first aspect for fulfilling the object of the present invention, each root defined by the plane of refraction of one prism among a plurality of the prisms and the plane of total reflection of another prism, the another prism being situated next to the one prism on the side of the plane of refraction of the one prism, is made to curve toward the another prism side from the one prism side, so that when releasing, from a mold, the molded product (Fresnel lens sheet) produced by the use of the mold, the angular protrusions of the mold never cut into the Fresnel lens sheet. The Fresnel lens sheet can therefore be easily released from the mold. Further, since the prisms are made so that each root between two prisms is curved toward the another prism side from the one prism side, that is, each root is curved toward the plane of total reflection of each prism, it is possible to avoid the problem that occurs when each root between two prisms is curved in the direction opposite to the above-described direction (i.e., each root is curved toward the plane of refraction) (the problem that the curved roots interfere with part of light totally reflected from the plane of total reflection of each prism situated in the area in which the angle of incidence is large), and thus becomes possible to reduce the production of stray light.

According to the first aspect for fulfilling the object of the invention, by making, in the cross section of each prism vertical to its edge, the distance of shift, due to curve, of the end of the root not more than 20% (more preferably not more than 15%) of the prism pitch, it is possible to decrease the interference between projected light and the curved roots that occurs in the area in which the angle of incidence is small. It is therefore possible to further decrease the amount of stray light to be produced.

Further, according to the first aspect for fulfilling the object of the invention, by making, in the cross section of each prism vertical to its edge, the length of the curved portion of the plane of refraction of the root and that of the curved portion of the plane of total reflection of the root not more than 40% (more preferably not more than 30%) of the total length of the plane of refraction and of the total length of the plane of total reflection, respectively, it is possible to decrease light that is refracted or reflected at the plane of refraction and the plane of total reflection of each prism in the direction different from the direction of normal emergence, thereby further reducing the production of stray light.

According to the second aspect for fulfilling the object of the present invention, in the step of making the mold for use in the molding of a Fresnel lens sheet, molding grooves are successively cut in a mold material, from a molding groove that corresponds to the prism to be situated on the side close to a light source upon use of the Fresnel lens sheet, to a molding groove that corresponds to the prism to be situated on the side distant from the light source upon use of the Fresnel lens sheet, so that the resin (molded Fresnel lens sheet) can be easily released from the mold. It is thus possible to efficiently produce the Fresnel lens sheet. Moreover, a Fresnel lens sheet that scarcely produces stray light can be obtained through this production process.

According to the third aspect for fulfilling the object of the present invention, the process comprises the step of making a master mold that is the original of a mold for use in the molding of a Fresnel lens sheet and the step of reproducing a mold from the master mold, and in the step of making the master mold, molding grooves are successively cut in a material for the master mold, from a molding groove that corresponds to the prism to be situated on the side close to a light source upon use of the Fresnel lens sheet, to a molding groove that corresponds to the prism to be situated on the side distant from the light source upon use of the Fresnel lens sheet, so that the resin (molded Fresnel lens sheet) can be easily released from the mold. It is thus possible to produce the Fresnel lens sheet with high efficiency. Further, a Fresnel lens sheet that scarcely produces stray light can be obtained through this production process. Furthermore, it is possible to produce a plurality of molds from the master mold without conducting cutting, so that the production of a Fresnel lens sheet becomes easier.

According to the fourth aspect for fulfilling the object of the present invention, the mold for use in the molding of a Fresnel lens sheet is made by successively cutting molding grooves in a material for the mold, from a molding groove that corresponds to the prism to be situated on the side close to a light source upon use of the Fresnel lens sheet, to a molding groove that corresponds to the prism to be situated on the side distant from the light source upon use of the Fresnel lens sheet, so that each angular protrusion created between two neighboring molding grooves is curved toward the molding groove that corresponds to the prism to be situated on the side close to a light source upon use of the Fresnel lens sheet, from the direction of the molding groove that corresponds to the prism to be situated on the side distant from the light source upon use of the Fresnel lens sheet. For this reason, if the mold made in this manner is used, it becomes possible to obtain a Fresnel lens sheet according to the above-described first aspect for fulfilling the object of the present invention. Therefore, the molded Fresnel lens sheet can be easily released from this mold, and, if this mold is used for molding, it is possible to obtain a Fresnel lens sheet that scarcely produces stray light.

According to the fifth aspect for fulfilling the object of the present invention, the master mold that is the original of a mold for use in the molding of a Fresnel lens sheet is made by successively cutting molding grooves in a material for the master mold, from a molding groove that corresponds to the prism to be situated on the side close to a light source upon use of the Fresnel lens sheet, to a molding groove that corresponds to the prism to be situated on the side distant from the light source upon use of the Fresnel lens sheet, so that each angular protrusion created between two neighboring molding grooves is curved toward the molding groove that corresponds to the prism to be situated on the side close to the light source upon use of the Fresnel lens sheet, from the direction of the molding groove that corresponds to the prism to be situated on the side distant from the light source upon use of the Fresnel lens sheet. Therefore, if a mold reproduced from the master mold that has been made in the above-described manner is used, it becomes possible to mold a Fresnel lens sheet according to the aforementioned first aspect for fulfilling the object of the present invention. It is thus possible to make a plurality of molds by reproducing from the above master mold without conducting cutting, and, in the molding of a Fresnel lens sheet using this mold, it is possible to easily release the molded Fresnel lens sheet from the mold as in the case of the above-described fourth aspect for fulfilling the object of the invention. Moreover, if this mold is used for molding, it is possible to obtain a Fresnel lens sheet that scarcely produces stray light.

According to the sixth aspect for fulfilling the object of the present invention, since it is possible to effectively reduce the production of stray light on the Fresnel lens sheet, the occurrence of double image, etc. due to stray light can be effectively prevented, and the rear projection screen can display a high-quality image.

DETAILED DESCRIPTION OF PREFERRED EMBODIMENT

Embodiments of the present invention will be described hereinafter with reference to the accompanying drawings.

FIGS. 1 to 16 are views for describing one embodiment of the present invention along with comparative examples, etc. The description will be given in the following order: (1) Structure of Fresnel Lens Sheet, (2) Process of Producing Fresnel Lens Sheet, and (3) Rear Projection Screen Comprising Fresnel Lens Sheet.

(1) Structure of Fresnel Lens Sheet

First of all, the structure of a Fresnel lens sheet according to this embodiment will be described with reference to FIG. 1.

Figure 1:
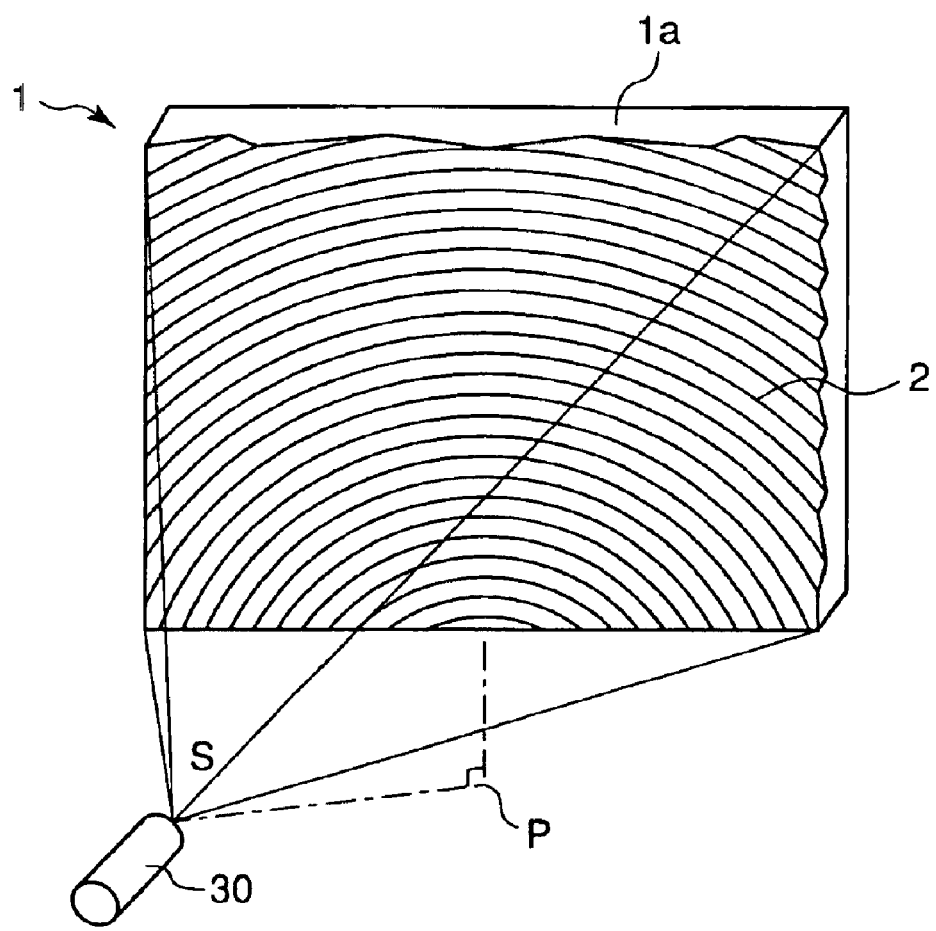
FIG. 1 is a perspective view showing the entire structure of a Fresnel lens sheet according to one embodiment of the present invention.

A Fresnel lens sheet 1 according to this embodiment is for condensing light (imaging light) S obliquely projected from a projector (light source) 30 to let the light emerge toward the viewer's side as nearly parallel rays, and has, on the incident side of a base 1a in sheet form, a plurality of prisms 2 in the shape of circular arcs, as shown in FIG. 1. In this embodiment, the prisms 2 are disposed around the center P of concentric circles that is present on the extension of the Fresnel lens sheet 1. Further, the spacing (pitch) of the prism 2 is set to 1.0 mm or less, preferably about 0.1 mm, so that viewers never visually perceive the prisms 2.

Figure 2:
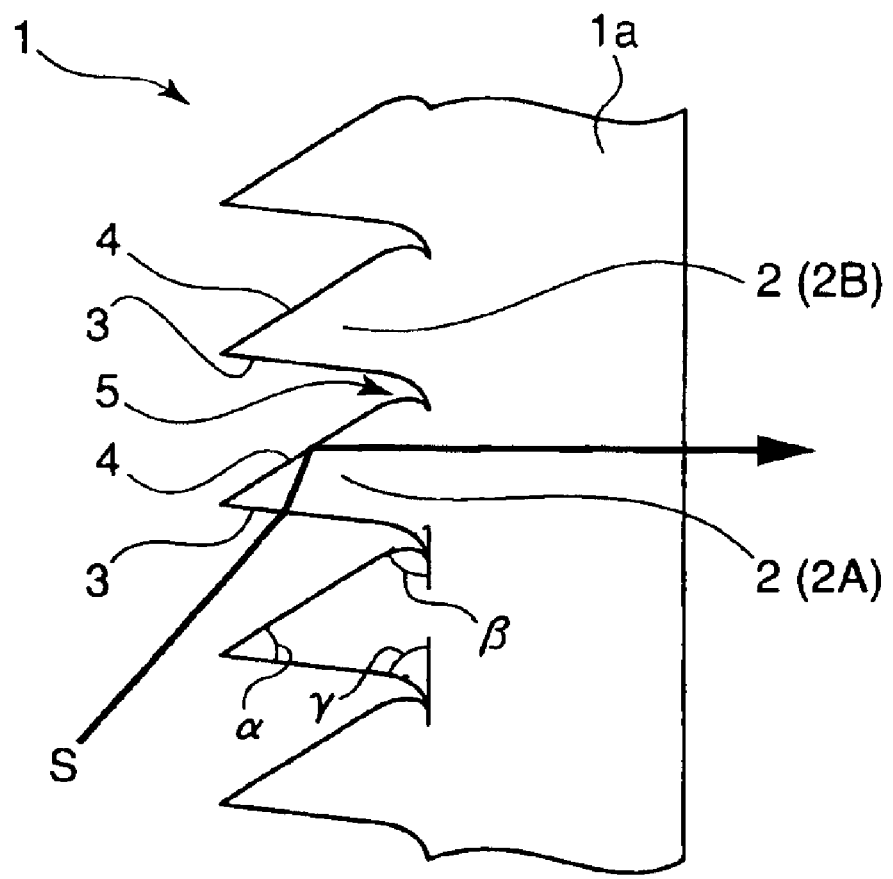
FIG. 2 is a sectional view of the Fresnel lens sheet shown in FIG. 1, taken in the direction of thickness.

FIG. 2 is a sectional view of the Fresnel lens sheet 1 shown in FIG. 1, taken in the direction of thickness. As shown in FIG. 2, each prism 2 is formed to have a nearly triangular cross section, and has a plane of refraction 3 that refracts projected light S incident on the incident side of the Fresnel lens sheet 1 and a plane of total reflection 4 that totally reflects, toward the viewer's side, at least part of the light refracted at the plane of refraction 3.

The angle of incidence at which projected light S is incident on the Fresnel lens sheet 1 varies according to the point of incidence on the Fresnel lens sheet 1. It is therefore necessary to vary the shape of each prism 2 depending upon the angle of incidence at which projected light S is incident on the point. In this case, the shape of each prism 2 may be varied by changing the angles of the plane of total reflection $\beta$ and of the plane of refraction $\gamma$, of the prism 2, with the apical angle $\alpha$, of the prism 2 being fixed. Alternatively, all of the apical angle $\alpha$, the angle of the plane of total reflection $\beta$, and the angle of the plane of refraction $\gamma$ may also be varied in order to vary the shape of each prism 2.

Further, each prism 2 is made so that a root 5 between a prism 2A and a prism 2B situated next to the prism 2A, on the side of the plane of total reflection 4 of the prism 2A (a root 5 defined by the plane of refraction 3 of one prism 2B and the plane of total reflection 4 of another prism 2A situated next to the one prism 2B, on the side of the plane of refraction 3 of the one prism 2B) is curved toward the prism 2A side from the prism 2B side.

Figure 3:
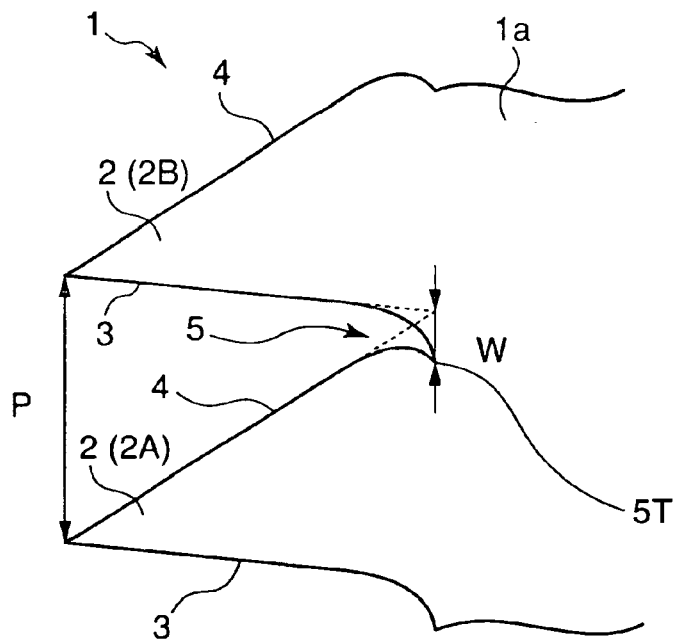
FIG. 3 is an illustration for explaining the degree of curve of the root between two prisms on the Fresnel lens sheet shown in FIGS. 1 and 2.

When forming the prisms 2 in the above-described manner so that the roots 5 are curved toward the prism 2A, it is preferable to make each prism 2 so that, in the cross section of each prism 2 vertical to its edge, the distance W of shift, due to curve, of the end 5T of the root 5 is not more than 20% (preferably not more than 15%) of the pitch P of the prisms 2 (see FIG. 3).

Figure 4:
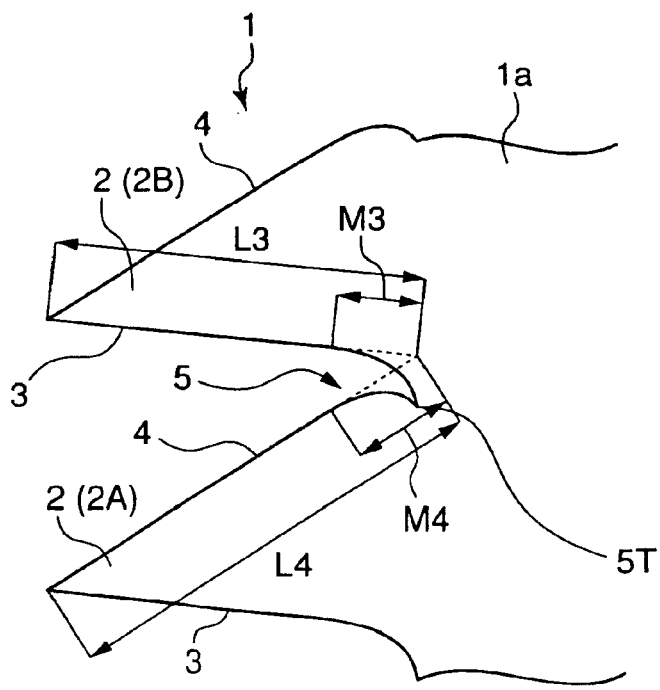
FIG. 4 is an illustration for explaining the range of curve of the root between two prisms on the Fresnel lens sheet shown in FIGS. 1 and 2.

Further, when forming the prisms 2 in the above-described manner so that the roots 5 are curved toward the prism 2A, it is preferable to make each prism 2 so that, in the cross section of each prism 2 vertical to its edge, the length M3 of the curved portion of the plane of refraction 3 of the root 5 and the length M4 of the curved portion of the plane of total reflection 4 of the root 5 are not more than 40% (preferably not more than 30%) of the total length L3 of the plane of refraction 3 and of the total length L4 of the plane of total reflection 4, respectively (see FIG. 4).

The advantageous features of the Fresnel lens sheet 1 thus structured will be described below.

Figure 5:
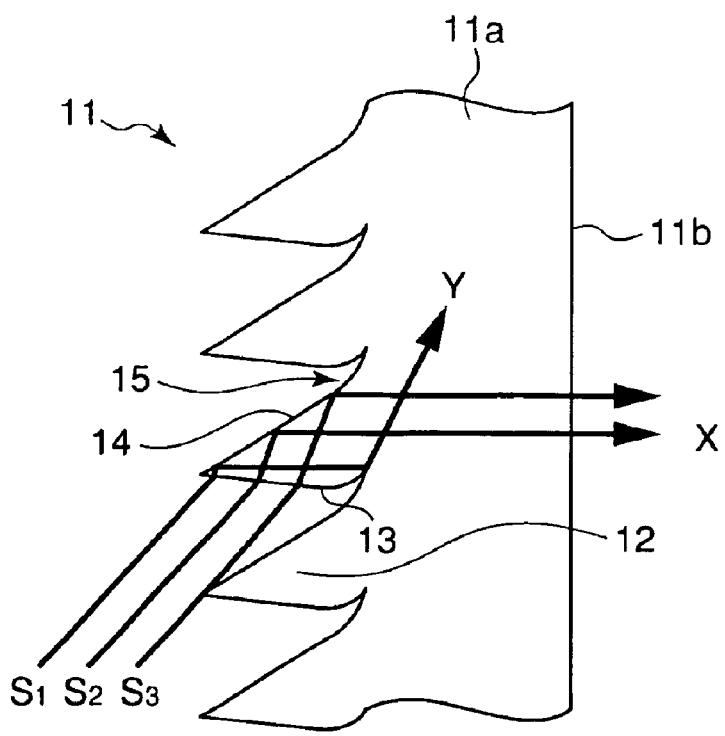
FIG. 5 is an illustration for explaining the light path of projected light in the area of the Fresnel lens sheet of Comparative Example in which the angle of incidence of projected light is large.

For comparison, the light path of projected light in a Fresnel lens sheet 11 in which the roots are curved in the direction opposite to the direction in the Fresnel lens sheet 1 according to this embodiment is firstly described with reference to FIGS. 5 and 6. FIG. 5 is an illustration showing the light path of projected light in the area on the Fresnel lens sheet 11 in which the angle of incidence of projected light is large (e.g., 50°), and FIG. 6 is an illustration showing the light path of projected light in the area on the Fresnel lens sheet 11 in which the angle of incidence of projected light is small (e.g., 45°).

As shown in FIG. 5, in the area on the Fresnel lens sheet 11 in which the angle of incidence of projected light is large, projected light S2 and S3 that are incident on the center and beginning of the plane of refraction 3 of each prism 2, respectively, are refracted at the plane of refraction 3 and then totally reflected at the plane of total reflection 4 to emerge from the plane of emergence 11b as normal light X. On the contrary, projected light S1 incident on the edge of the plane of refraction 3 of each prism 2 is refracted at the plane of refraction 3 and then totally reflected at the plane of total reflection 4, and this totally reflected light is obliquely reflected at the curved portion of the plane of refraction 3, the curved root 5, to become stray light Y.

Figure 6:
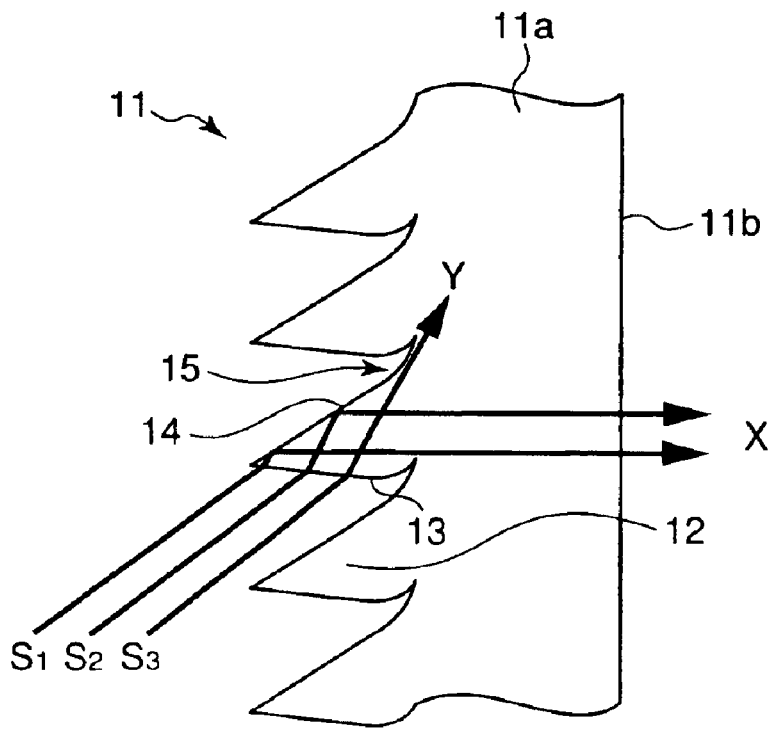
FIG. 6 is an illustration for explaining the light path of projected light in the area of the Fresnel lens sheet of Comparative Example in which the angle of incidence of projected light is small.

On the other hand, as shown in FIG. 6, in the area on the Fresnel lens sheet 11 in which the angle of incidence of projected light is small, projected light S1 and S2 that are incident on the edge and center of the plane of refraction 3 of each prism 2, respectively, are refracted at the plane of refraction 3 and then totally reflected at the plane of total reflection 4 to emerge from the plane of emergence 11b as normal light X. However, projected light S3 incident on the beginning of the plane of refraction 3 of each prism 2 is refracted at the plane of refraction 3, and the refracted light does not reach the plane of total reflection 4 and becomes stray light Y.

Thus, in the Fresnel lens sheet 11 in which the roots are curved in the direction opposite to that in the Fresnel lens sheet 1 according to this embodiment, stray light Y is produced both in the area in which the angle of incidence of projected light is small and the area in which the angle of incidence of projected light is large.

Figure 7:
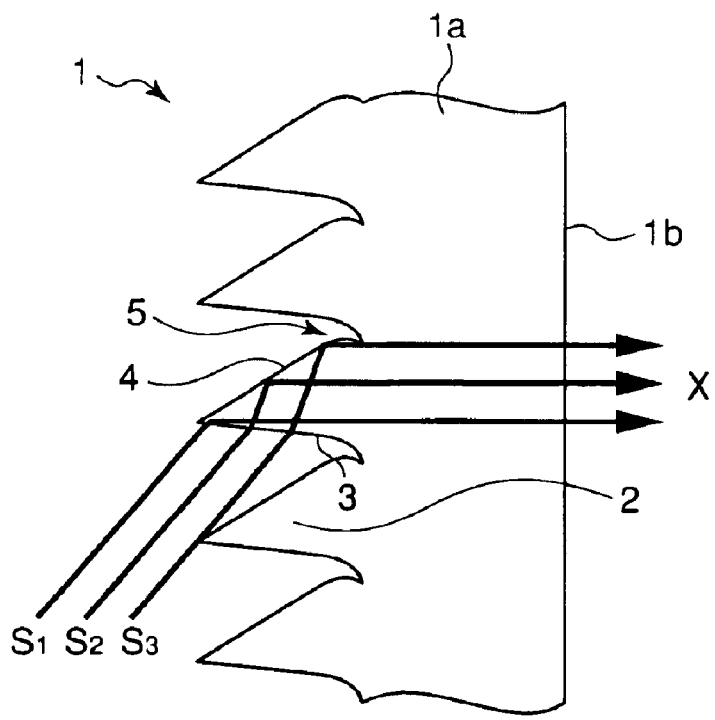
FIG. 7 is an illustration for explaining the light path of projected light in the area of the Fresnel lens sheet shown in FIGS. 1 and 2 in which the angle of incidence of projected light is large.

Next, the light path of projected light in the Fresnel lens sheet 1 according to this embodiment will be described with reference to FIGS. 7 and 8. FIG. 7 is an illustration showing the light path of projected light in the area on the Fresnel lens sheet 1 in which the angle of incidence of projected light is large (e.g., 50°), and FIG. 8 is an illustration showing the light path of projected light in the area on the Fresnel lens sheet 1 in which the angle of incidence of projected light is small (e.g., 45°).

As shown in FIG. 7, in the area on the Fresnel lens sheet 1 in which the angle of incidence of projected light is large, projected light S1, S2 and S3 that are incident on the edge, center and beginning of the plane of refraction 3 of each prism 2, respectively, are refracted at the plane of refraction 3 and then totally reflected at the plane of total reflection 4 to emerge from the plane of emergence 1b as normal light X.

Figure 8:
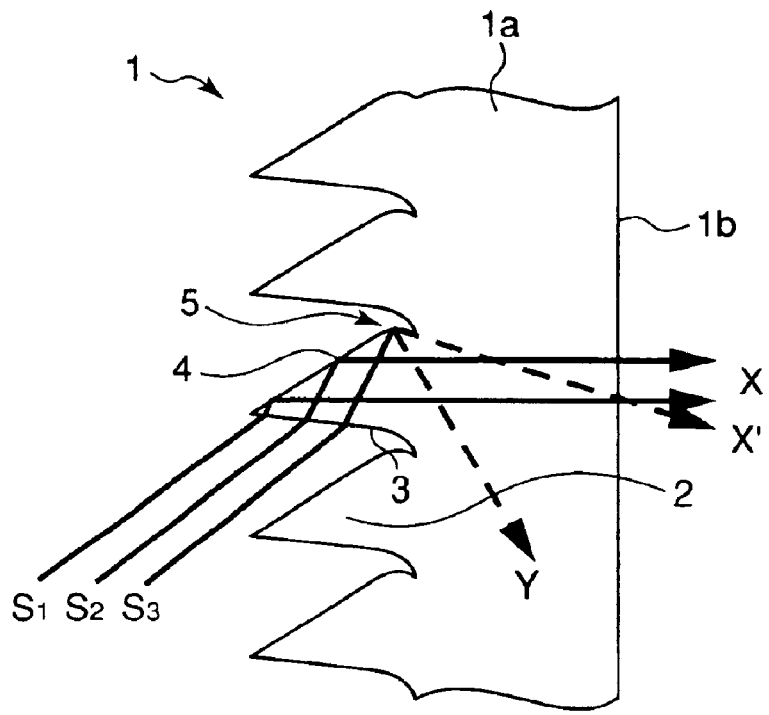
FIG. 8 is an illustration for explaining the light path of projected light in the area of the Fresnel lens sheet shown in FIGS. 1 and 2 in which the angle of incidence of projected light is small.

On the other hand, as shown in FIG. 8, in the area on the Fresnel lens sheet 1 in which the angle of incidence of projected light is small, projected light S1 and S2 that are incident on the edge and center of the plane of refraction 3 of each prism 2, respectively, are refracted at the plane of refraction 3 and then totally reflected at the plane of total reflection 4 to emerge from the plane of emergence 1b as normal light X. On the contrary, projected light S3 incident on the beginning of the plane of refraction 3 of each prism 2 is refracted at the plane of refraction 3 and then reaches the plane of total reflection 4. At this time, since the portion of the plane of total reflection 4 at which the projected light S3 arrives is curved, this light is totally reflected in the direction inclined to the light-source side (the lower side in FIG. 8) and becomes either normal light X' or stray light Y depending upon the angle of this inclination.

Since the distance W of shift of the end 5T of each root 5 is, as mentioned above, herein made not more than 20% (preferably not more than 15%) of the pitch P of the prisms 2, it is possible to minimize the production of stray light Y that is caused when the root 5 interferes with the projected light S3 totally reflected from the plane of total reflection 4.

Figure 9A:
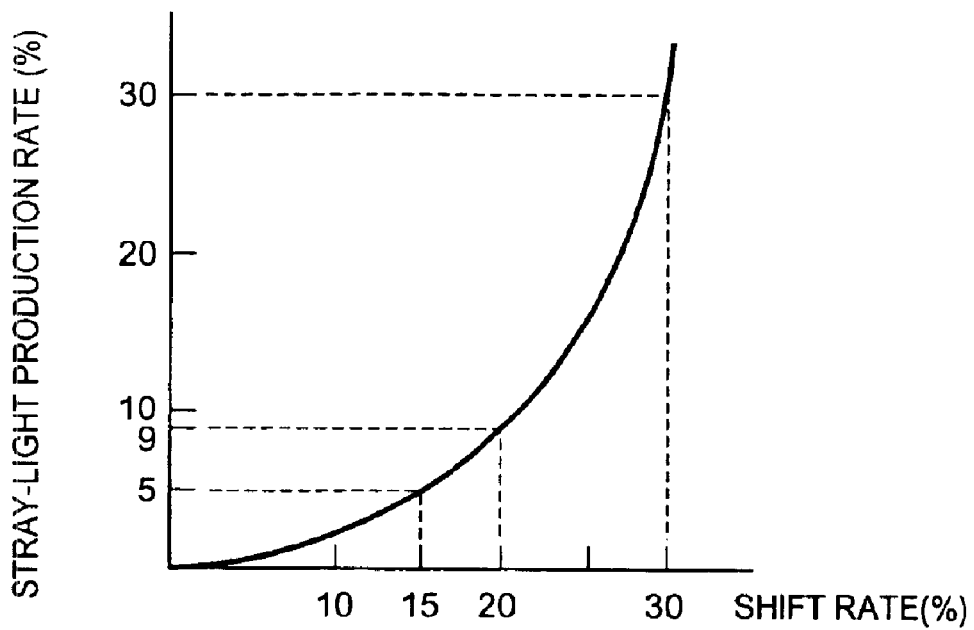
FIG. 9A is a diagram showing the relationship between the rate of shift of the root between two prisms (the proportion of the distance W of shift of the end of the root to the prism pitch) on the Fresnel lens sheet shown in FIGS. 1 and 2 and the rate of production of stray light Y.

For example, the relationship, in the prism 2 on which projected light S is incident at an angle of 45°, between the shift rate (the proportion of the distance W of shift to the pitch P of the prisms 2) and the rate of production of stray light Y is shown in FIG. 9A. Referring to FIG. 9A, when the shift rate exceeds 20%, the rate of production of stray light Y exceeds 9% (nearly 10%). In this case, when the Fresnel lens sheet 1 is used for a rear projection screen that will be described later, the occurrence of double image is clearly observed, so that the displayed image deteriorates to a significant extent. However, if the shift rate is made 20% or less, it is possible to restrain the occurrence of double image to such an extent that the double image does not adversely affects the observation of the displayed image. Moreover, if the shift rate is made 15% or less, it is possible to make the rate of production of stray light Y, 5% or less, so that the occurrence of double image can be restrained to such an extent that the double image is scarcely recognized.

Further, as mentioned above, since the length M3 of the curved portion of the plane of refraction 3 of the root 5 and the length M4 of the curved portion of the plane of total reflection 4 of the root 5 are made not more than 40% (preferably not more than 30%) of the total length L3 of the plane of refraction 3 and of the total length L4 of the plane of total reflection 4, respectively, it is possible to minimize the production of stray light Y that is caused because the plane of total reflection 4 at which projected light S arrives is curved.

Figure 9B:
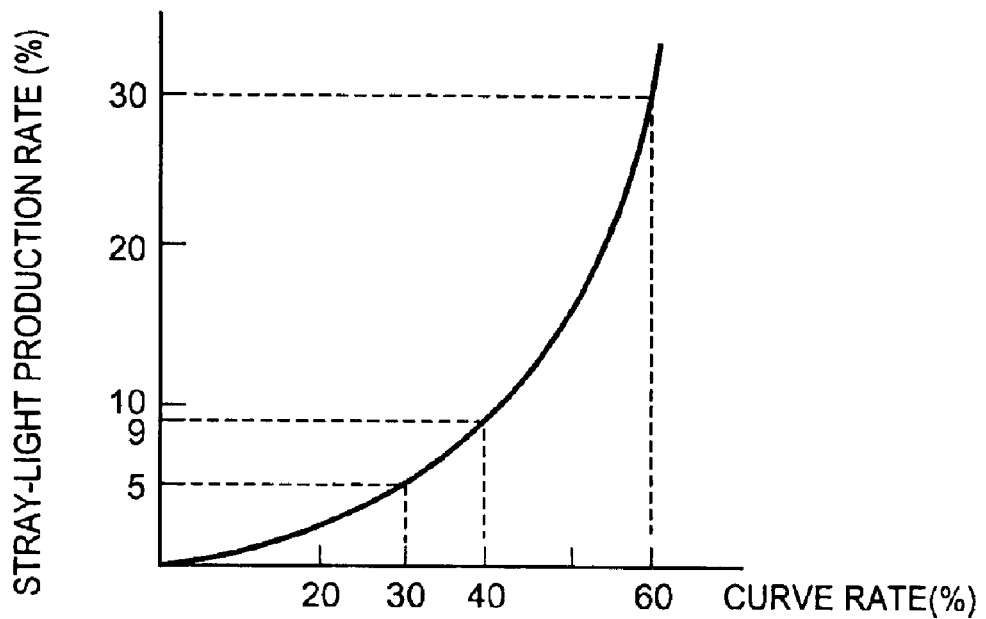
FIG. 9B is a diagram showing the relationship between the rate of curve of the root between two prisms (the proportion of the length M of the curved portion of the plane of refraction or of total reflection to the total length L of the plane of refraction or of total reflection) on the Fresnel lens sheet shown in FIGS. 1 and 2 and the rate of production of stray light Y.

For example, the relationship, in the prism 2 on which projected light S is incident at an angle of 45°, between the curve rate (the proportion of the length M of the curved portion of the plane of refraction 3 or of the plane of total reflection 4 to the total length L of the plane of refraction 3 or of the plane of total reflection 4) and the rate of production of stray light Y is shown in FIG. 9B. Referring to FIG. 9B, when the curve rate exceeds 40%, the rate of production of stray light Y exceeds 9% (nearly 10%). In this case, when the. Fresnel lens sheet 1 is used for a rear projection screen that will be described later, the occurrence of double image is clearly observed, so that the displayed image deteriorates to a significant extent. However, if the curve rate is made 40% or less, it is possible to restrain the occurrence of double image to such an extent that the double image does not adversely affects the observation of the displayed image. Moreover, if the curve rate is made 30% or less, it is possible to make the rate of production of stray light Y, 5% or less, and the occurrence of double image can therefore be restrained to such an extent that the double image is scarcely recognized.

Thus, in the Fresnel lens sheet 1 according to this embodiment, stray light Y is never produced in the area in which the angle of incidence of projected light S is large. Moreover, in the area in which the angle of incidence of projected light S is small, although stray light Y may be produced, the production of it is minimized.

As described above, the Fresnel lens sheet 1 according to this embodiment can reduce the production of stray light Y more greatly than the Fresnel lens sheet 11 in which the roots are curved in the direction opposite to that in the Fresnel lens sheet 1.

Figure 10:
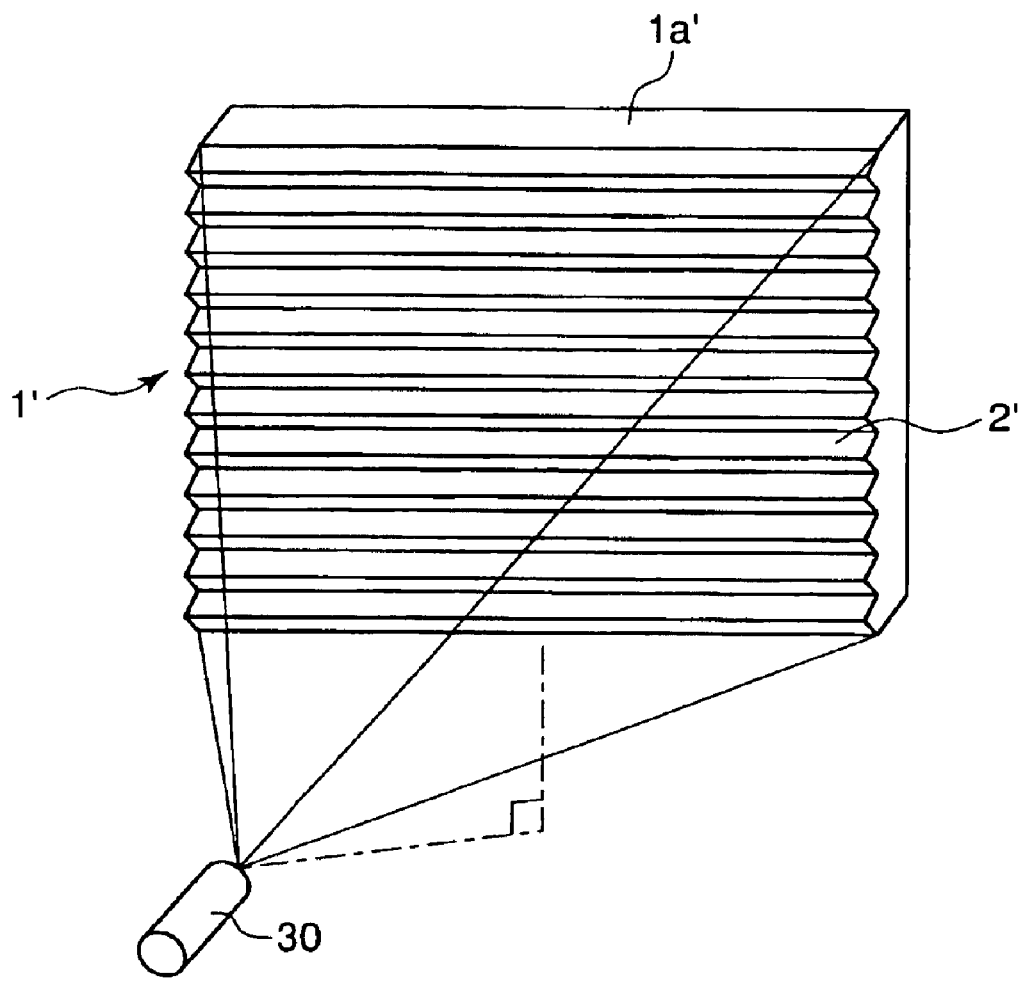
FIG. 10 is a perspective view showing the entire structure of a Fresnel lens sheet according to another embodiment of the present invention.
Figure 11:
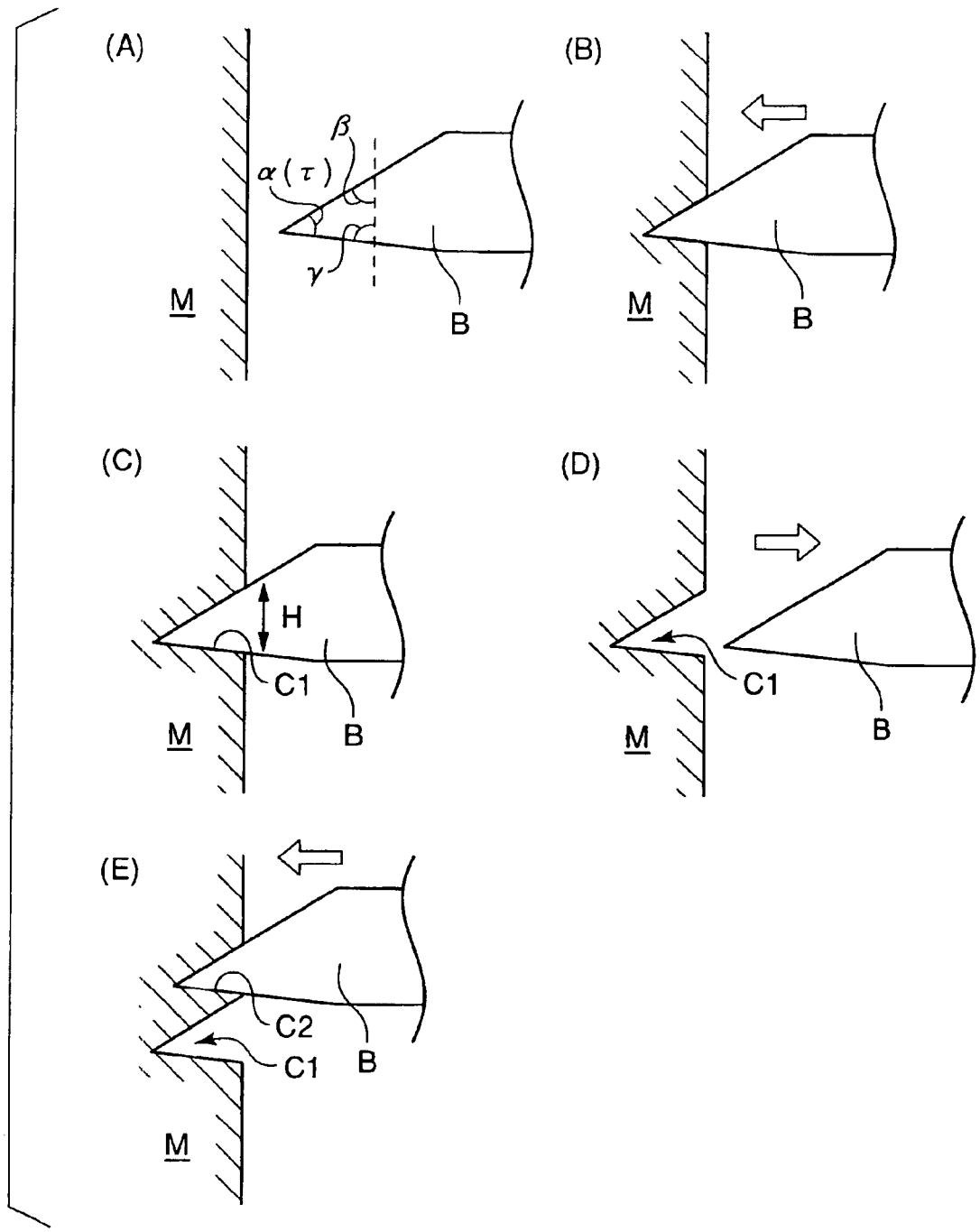
FIG. 11 is an illustration for explaining the cutting procedure for making a mold for use in the molding of a Fresnel lens sheet according to one embodiment of the present invention.
Figure 12:
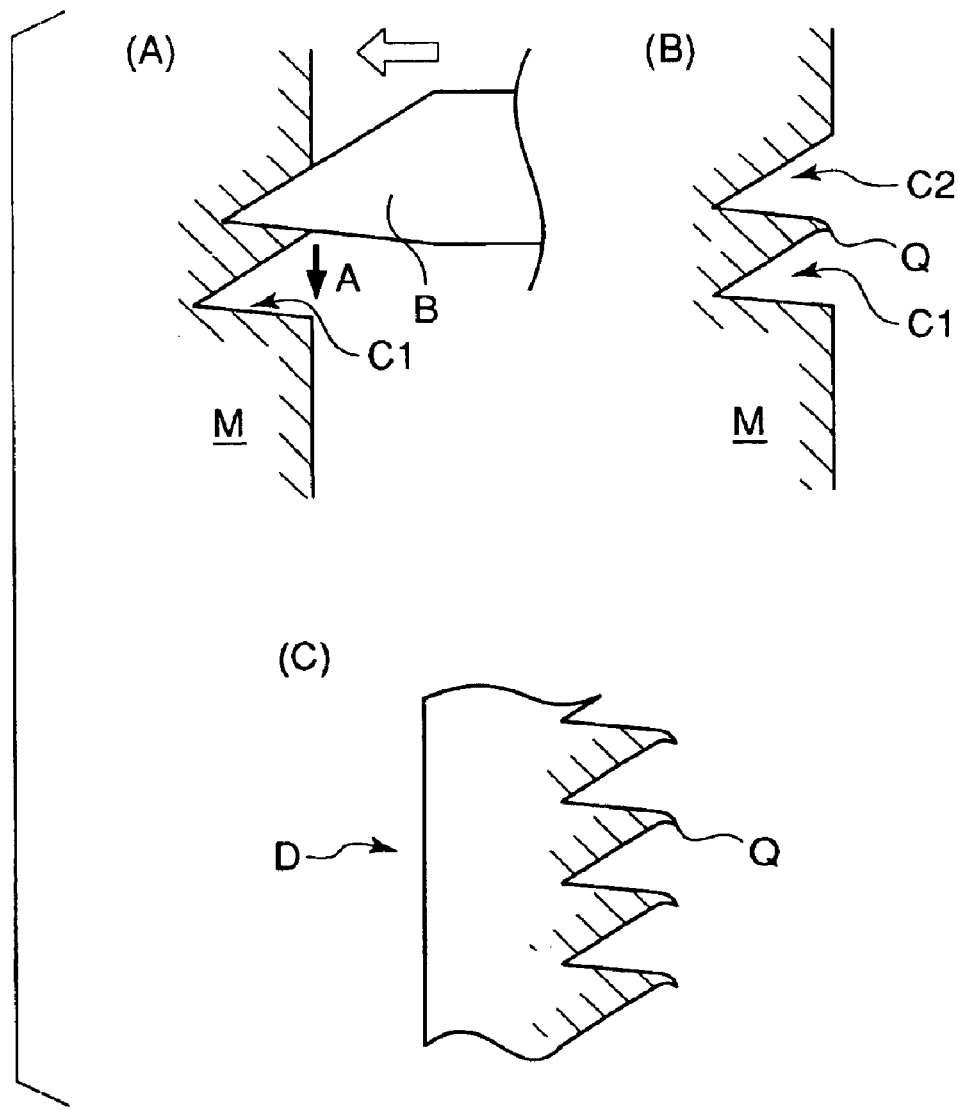
FIG. 12 is an illustration for explaining the features (advantages) of the mold made in accordance with the cutting procedure shown in FIG. 11.

Described above is the Fresnel lens sheet 1 having a plurality of prisms 2 in the shape of circular arcs that extend on the incident side of a base 1a in sheet form. However, the present invention is also applicable to a so-called linear Fresnel lens sheet 1' as shown in FIG. 10, which has a plurality of prisms 2' that extend linearly on the incident side of a base 1a' in sheet form. Even in this case, it is possible to obtain the same actions and effects as those of the Fresnel lens sheet 1.

(2) Process of Producing Fresnel Lens Sheet

Next, a process of producing the Fresnel lens sheet 1 will be described.

(A) Method of Making Mold

First of all, a method of making a mold D for use in the molding of the Fresnel lens sheet 1 will be explained.

The explanation will be given with reference firstly to a mold D for use in the molding of the Fresnel lens sheet 1 having a plurality of prisms 2 that are formed by varying both the angle of the plane of total reflection $\beta$ and the angle of the plane of refraction $\gamma$, with the apical angle $\alpha$ being fixed.

The mold D is made by cutting a mold material M into a shape that corresponds to the shape of the prisms 2 on the Fresnel lens sheet 1. A material that is hardly deformed, such as steel, may be used as the mold material M. However, if such a material is used, a cutting tool B is easily damaged during the operation of cutting of the material with the cutting tool B, which will be described later. If the cutting tool B is damaged, it is necessary to repeat the cutting operation from the beginning, and the productivity is thus remarkably decreased. For this reason, it is preferable to use a material that is excellent in cutting ability, such as aluminum, copper or nickel.

Cutting of a mold material M is conducted in the following manner, for example: a plate of the mold material M is fixed to a face lathe and rotated, and a cutting tool B is pressed against the mold material M that is rotating. In this case, the tip angle $\tau$ of the cutting tool B is made equal to the apical angle $\alpha$ of the prism 2.

In the case of the mold D according to this embodiment, molding grooves are successively cut in a mold material M with a cutting tool B, from a molding groove C that corresponds to the prism to be situated on the side close to a light source 30 upon use of the Fresnel lens sheet, to a molding groove that corresponds to the prism to be situated on the side distant from the light source 30 upon use of the Fresnel lens sheet. The procedure for cutting molding grooves in a mold material M in the above-described manner will be explained with reference to FIG. 11.

Firstly, in order to cut a molding groove C1 that corresponds to the prism 2 to be situated on the side close to a light source 30 upon use of the Fresnel lens sheet 1, a cutting tool B is directed to the point on a mold material M that corresponds to the position of this prism 2 (see FIG. 11(A)).

At this time, the cutting tool B is directed to the mold material M so that the cut surface has angles equal to the angles of the plane of total reflection $\beta$ and of the plane of refraction $\gamma$ of the prism 2. The cutting tool B is then forced into the mold material M while keeping the cutting tool B at the above cutting angle, thereby cutting the mold material M (FIG. 11(B)).

When the width of cut H becomes equal to the width of the prism 2, the pressing of the cutting tool B is stopped (FIG. 11(C)), and the cutting tool B is drawn out of the mold material M (FIG. 11(D)).

After the cutting, in the above-described manner, of the molding groove C1 that corresponds to the prism 2 to be situated on the side close to a light source 30 has been completed, a molding groove C2 that corresponds to the prism 2 situated next to the above prism 2, on the side distant from the light source 30, is cut (FIG. 11(E)).

Thus, molding grooves C are cut successively from a molding groove C that corresponds to the prism 2 to be situated on the side close to a light source 30, to a molding groove C that corresponds to the prism 2 to be situated on the side distant from the light source 30, thereby making a mold D.

The advantageous features of the mold D made in the aforementioned manner will be described below.

Namely, in this case, when, after cutting a molding groove C1 that corresponds to the prism 2 to be situated on the side close to a light source 30, a molding groove C2 that corresponds to the prism 2 to be situated on the side more distant from the light source 30 than the above prism 2 is cut, pressing force is, as shown in FIG. 12(A), exerted by the cutting tool B vertically to the cut surface (in the direction A shown in the figure). Owing to this pressing force, the angular protrusion Q that is created between the two neighboring molding grooves C1 and C2 of the mold D curves to the light-source 30 side (FIG. 12(B)). In the case where a material having good cutting ability, such as aluminum, which is easily deformed and curved, is used as the mold material M, each angular protrusion Q of the mold D curves to the light-source 30 side (toward the molding groove C1 that corresponds to the prism 2 to be situated on the side close to a light source 30 upon use of the Fresnel lens sheet 1, from the direction of the molding groove C2 that corresponds to the prism 2 to be situated on the side distant from the light source 30 upon use of the Fresnel lens sheet 1), as shown in FIG. 12(C).

When a Fresnel lens sheet 1 is molded by the use of the mold D that has been made so that the angular protrusions Q are curved to the light-source 30 side, the Fresnel lens sheet 1, molded product, can be easily released from the mold D as will be described later. Moreover, the Fresnel lens sheet 1 produced by using the mold D can reduce the production of stray light Y as mentioned previously.

Figure 13:
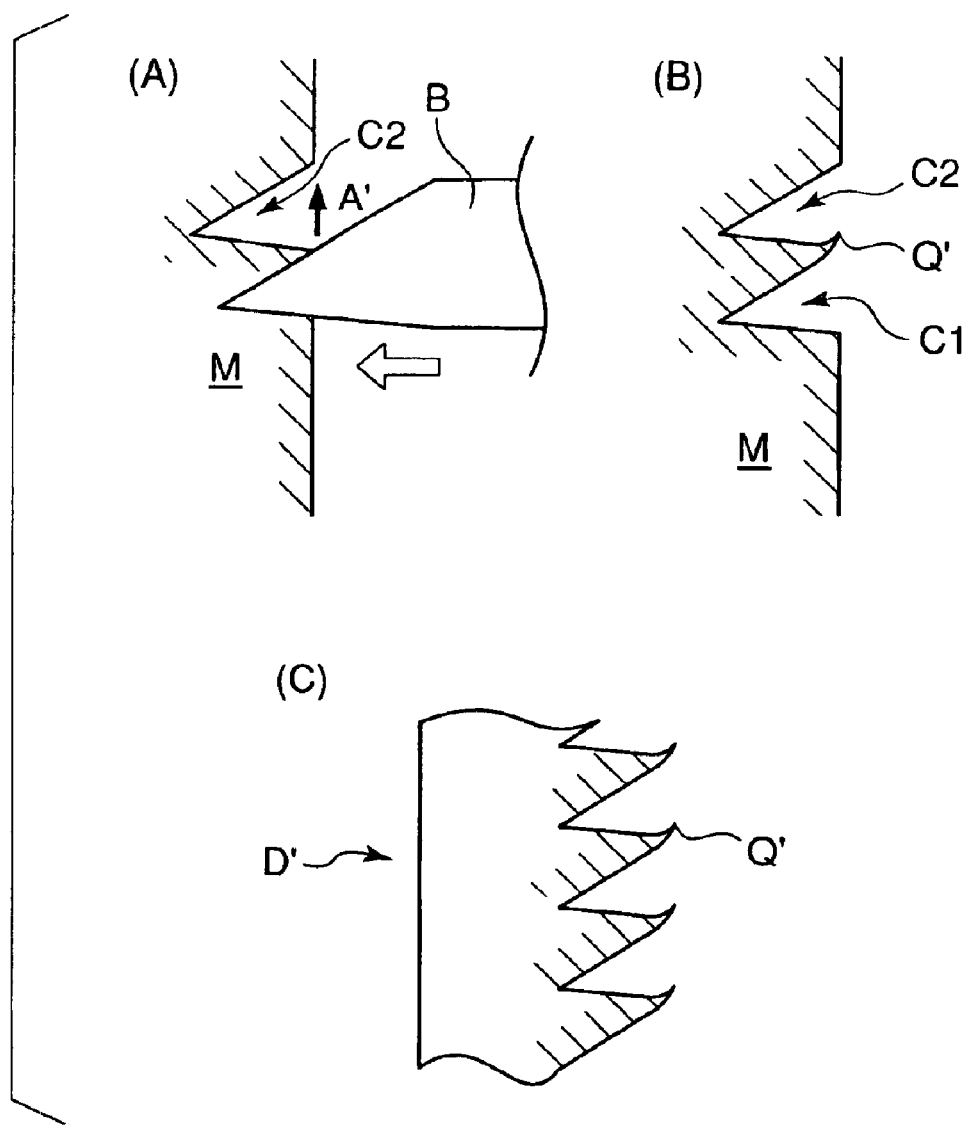
FIG. 13 is an illustration for explaining the features (disadvantages) of the mold of Comparative Example.

Now, the procedure for cutting a mold material M that is reverse to the above-described cutting procedure is shown in FIG. 13 for comparison.

Namely, in this case, when, after cutting a molding groove C2 that corresponds to the prism 2 to be situated on the side distant from a light source 30, a molding groove C1 that corresponds to the prism 2 to be situated on the side closer to the light source 30 than the above prism 2 is cut, pressing force is, as shown in FIG. 13(A), exerted by the cutting tool B vertically to the cut surface (in the direction A' shown in the figure). Owing to this pressing force, the angular protrusion Q' that is created between the two neighboring molding grooves C1 and C2. of the mold D' curves to the counter-light-source 30 side (FIG. 13(B)). Therefore, the angular protrusions Q' of the mold D' curve toward the side opposite to the light source 30, as shown in FIG. 13 (C).

In the case where a Fresnel lens sheet 11 is molded by the use of the mold D' that has been made so that the angular protrusions Q' are curved toward the side opposite to the light source 30, the Fresnel lens sheet 11, molded product, cannot be easily released from the mold D' and produces stray light Y greatly, as described under the above item "Description of the Related Art".

Described above is the mold D for use in the production of a Fresnel lens sheet 1 having a plurality of prisms 2 that are formed by varying both the angle of the plane of total reflection β and the angle of the plane of refraction γ, with the apical angle α fixed. However, the present invention is also applicable to a mold D for use in the production of a Fresnel lens sheet 1 having a plurality of prisms 2 that are formed by varying all of the apical angle α, the angle of the plane of total reflection β, and the angle of the plane of refraction γ.

Figure 14:
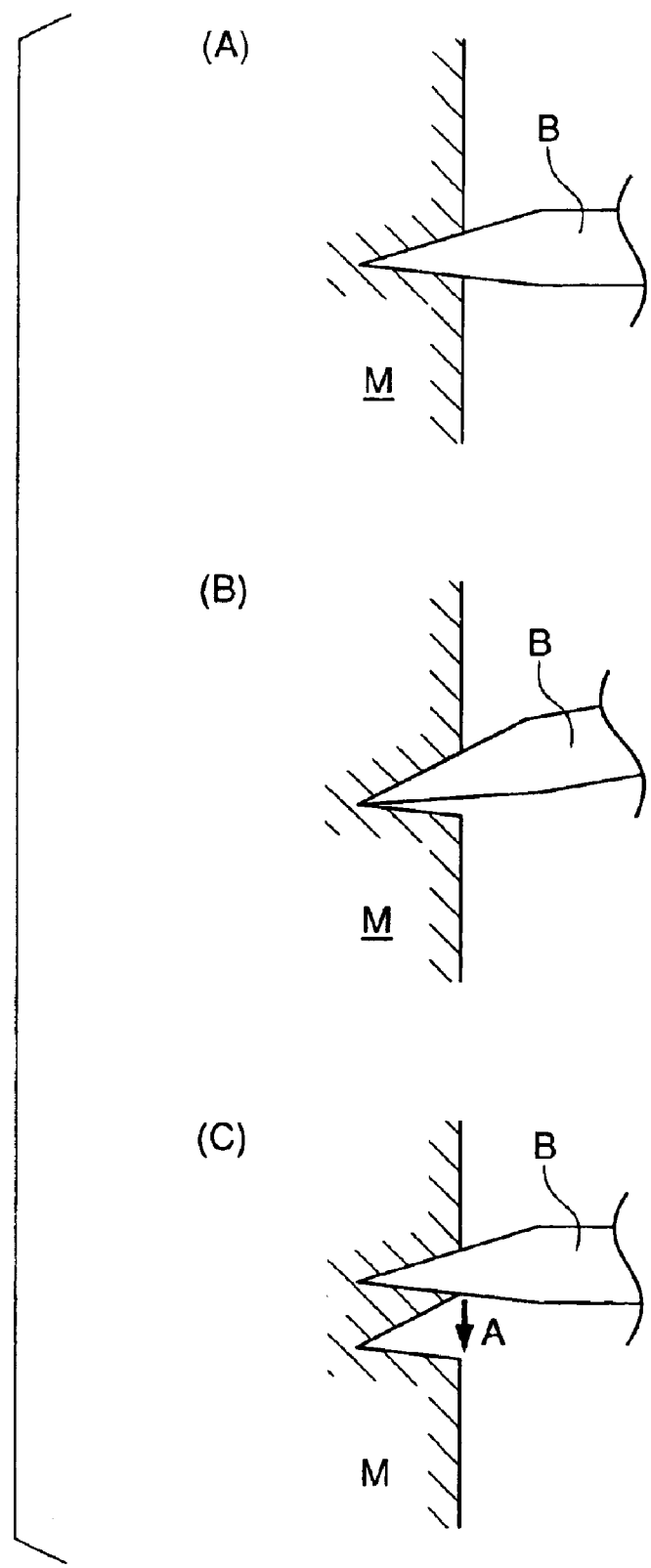
FIG. 14 is an illustration for explaining another cutting procedure for making a mold for use in the molding of a Fresnel lens sheet according to one embodiment of the present invention.

In this case, cutting may be conducted in the following manner by using a cutting tool B with a tip angle that is smaller than the apical angle α of the prism 2: as shown in FIG. 14, a portion that corresponds to the plane of refraction 3 of the prism 2 is firstly cut (FIG. 14(A)), and then a portion that corresponds to the plane of total reflection 4 of the prism 2 is cut (FIG. 14(B)). Also in this case, when, after cutting a molding groove C1 that corresponds to the prism 2 to be situated on the side close to a light source 30, a molding groove C2 that corresponds to the prism 2 to be situated on the side more distant from the light source 30 than the above prism 2 is cut, pressing force is exerted by the cutting tool B vertically to the cut surface (in the direction A shown in the figure). Owing to this pressing force, there can be obtained a mold D in which the angular protrusions Q are curved toward the light-source 30 side (FIG. 14(C)).

Described above is the mold D for use in the molding of the Fresnel lens sheet having a plurality of prisms in the shape of concentric arcs that extend on the incident side of a base 1a in sheet form. However, the present invention is also applicable to a mold for use in the molding of a so-called linear Fresnel lens sheet 1' having a plurality of prisms 2' linearly extending on the incident side of a base 1a' in sheet form.

In this case, for example, a sheet of a mold material M is wound around a support roll and fixed at a lathe, and while rotating this roll, molding grooves C that correspond to the prisms 2' are cut with a cutting tool B, thereby making a mold D for use in the molding of a Fresnel lens sheet 1'. The cutting procedure for making the mold D in this case is the same as that for making the mold D for use in the molding of the Fresnel lens sheet 1 except the above-described point, and the same actions and effects as those described above can be obtained.

(B) Process of Producing Fresnel Lens Sheet

Figure 15:
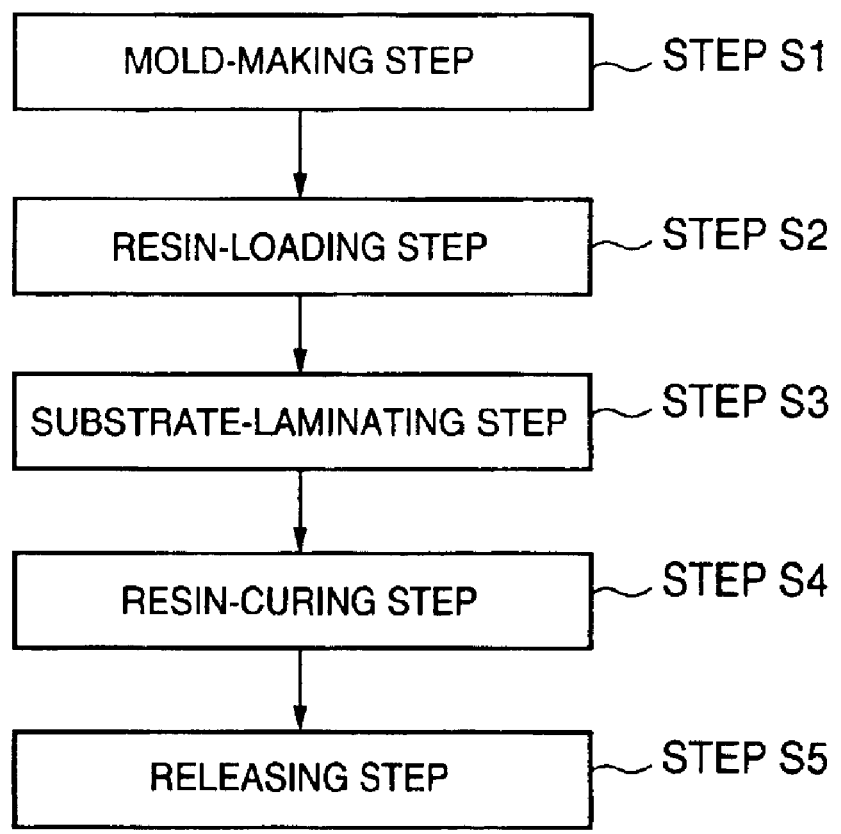
FIG. 15 is a flow chart for explaining a process of producing a Fresnel lens sheet according to one embodiment of the present invention.

Next, a process of producing the Fresnel lens sheet 1 using an ultraviolet-curing resin will be described with reference to FIG. 15.

First of all, a mold D for use in the molding of the Fresnel lens sheet 1 is made by the above-described method (Step S1: mold-making step). The concrete method of making the mold D is as described above, so that the detailed description of this method is omitted.

Next, an ultraviolet-curing resin is loaded in the mold D that has been made in Step S1 (Step S2: resin-loading step). Namely, by such a method as roll, gravure, dispenser or die coating, an ultraviolet-curing resin is loaded in the mold D that has been made in Step S1.

A substrate is then laminated to the ultraviolet-curing resin that has been loaded in the mold D in Step S2 (Step S3: substrate-laminating step). Namely, a substrate made from an ultraviolet-transmitting material is laminated to the ultraviolet-curing resin that has been loaded in the mold D in Step S2, and pressure is applied to the substrate with a pressure roll, thereby bringing the ultraviolet-curing resin and the substrate into close contact with each other.

Thereafter, the ultraviolet-curing resin to which the substrate has been laminated in Step S3 is cured (Step S4: resin-curing step). Namely, ultraviolet light is applied, through the substrate, to the ultraviolet-curing resin loaded in the mold D to cure the ultraviolet-curing resin.

Lastly, the ultraviolet-curing resin that has been cured in the mold D in Step S4 is released from the mold D (Step S5: releasing step). In this step, the ultraviolet-curing resin that has been cured in Step S4, that is, the molded Fresnel lens sheet 1, is released from the mold D. At this time, since the angular protrusions Q of the mold D are curved to the light-source 3 side as mentioned above, it is possible to release the resin (the Fresnel lens sheet 1, molded product) from the mold D with ease.

Namely, in the Fresnel lens sheet 1, the angle of the plane of refraction γ is greater than the angle of the plane of total reflection β, so that the molded Fresnel lens sheet 1 is gradually released from the mold D from the plane of total reflection 4 side of the prisms 2 (the side opposite to a light source 30). At this time, since the angular protrusions Q of the mold D are curved to the light-source 30 side, their tips never cut into the Fresnel lens sheet 1, molded product, and the Fresnel lens sheet 1 can be released from the mold D smoothly.

The Fresnel lens sheet 1 can be obtained not only by the above-described ultraviolet-curing resin method using an ultraviolet-curing resin, but also by a method using a light-transmitting resin material such as an acrylic, styrene, polycarbonate or epoxy resin, in which (1) a light-transmitting resin material in the molten state is loaded in a mold D in the shape that corresponds to the shape of the Fresnel lens sheet 1 and cured, and the cured resin is then released from the mold (casting method), or in which (2) a light-transmitting resin material that has been heated is loaded in the mold D and molded by the application of pressure, and the molded product is then released from the mold (hot-press method). Even in these methods, the Fresnel lens sheet 1, molded product, can be easily released from the mold D, as in the above-described ultraviolet-curing resin method.

(3) Rear Projection Screen Comprising Fresnel Lens Sheet

Next, a rear projection screen comprising the above-described Fresnel lens sheet 1 will be described with reference to FIG. 16.

Figure 16:
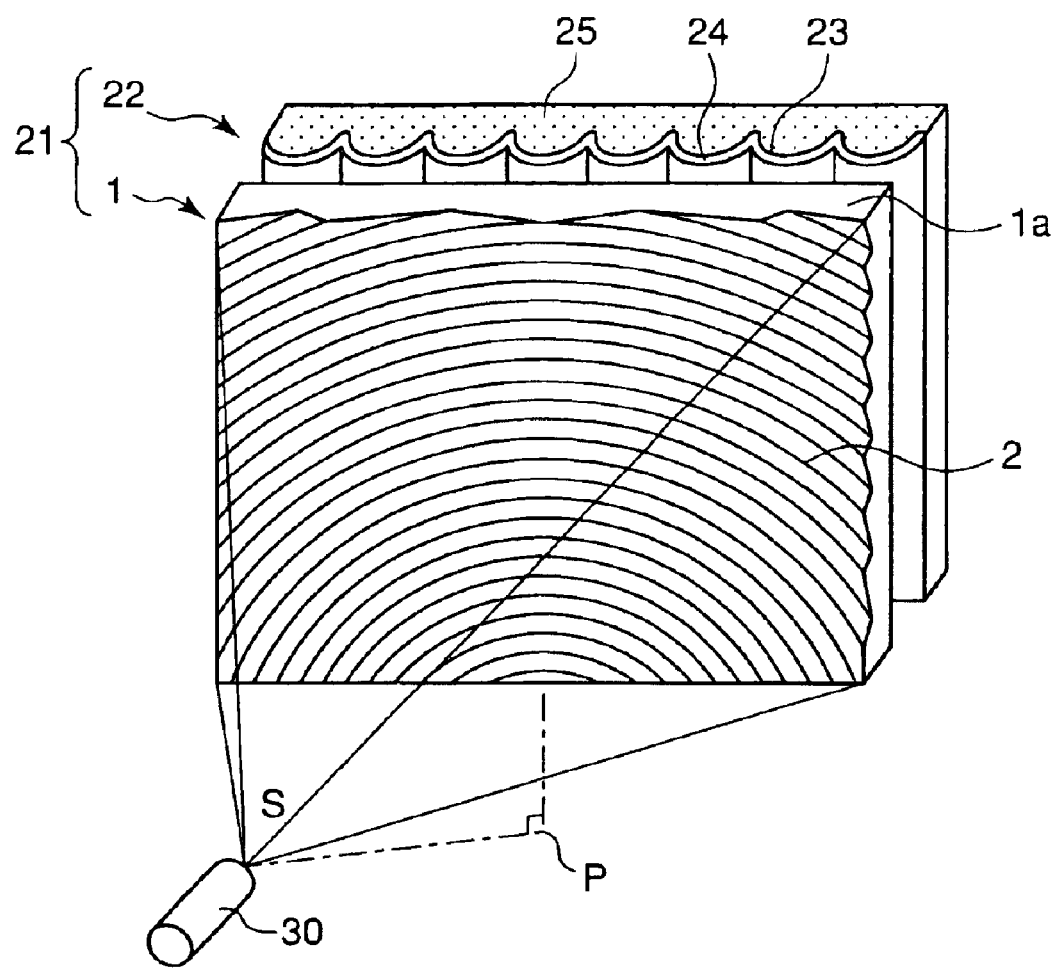
FIG. 16 is a perspective view showing the entire structure of a rear projection screen comprising a Fresnel lens sheet according to one embodiment of the present invention.
Figure 17:
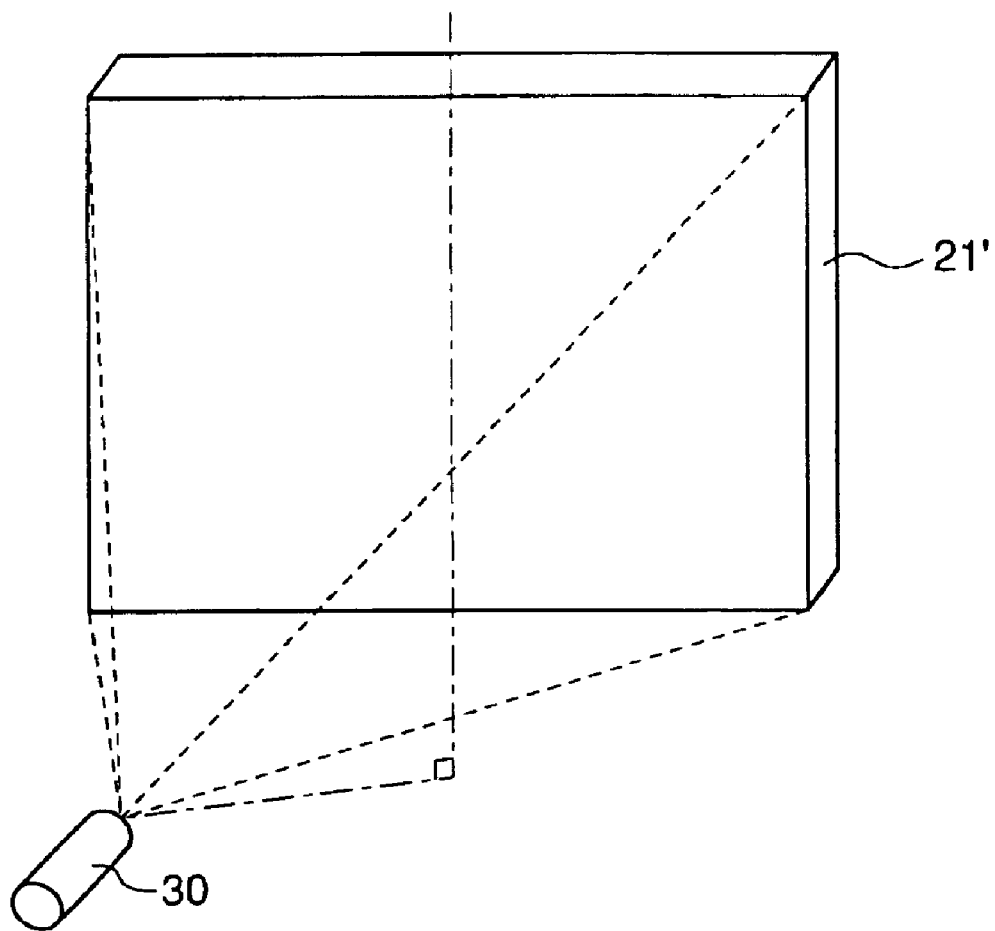
FIG. 17 is a view showing a conventional rear projection screen together with a projector (a projector obliquely projecting imaging light on the rear projection screen)
Figure 18:
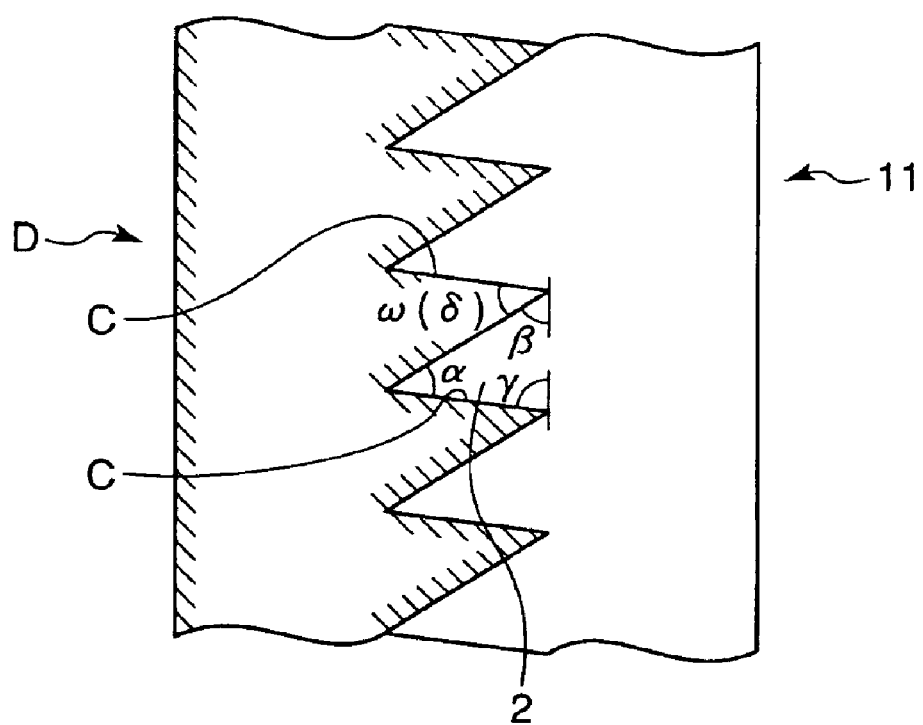
FIG. 18 is an illustration for explaining the relationship between a mold for use in the molding of a Fresnel lens sheet and the Fresnel lens sheet molded by the use of the mold.
Figure 19:
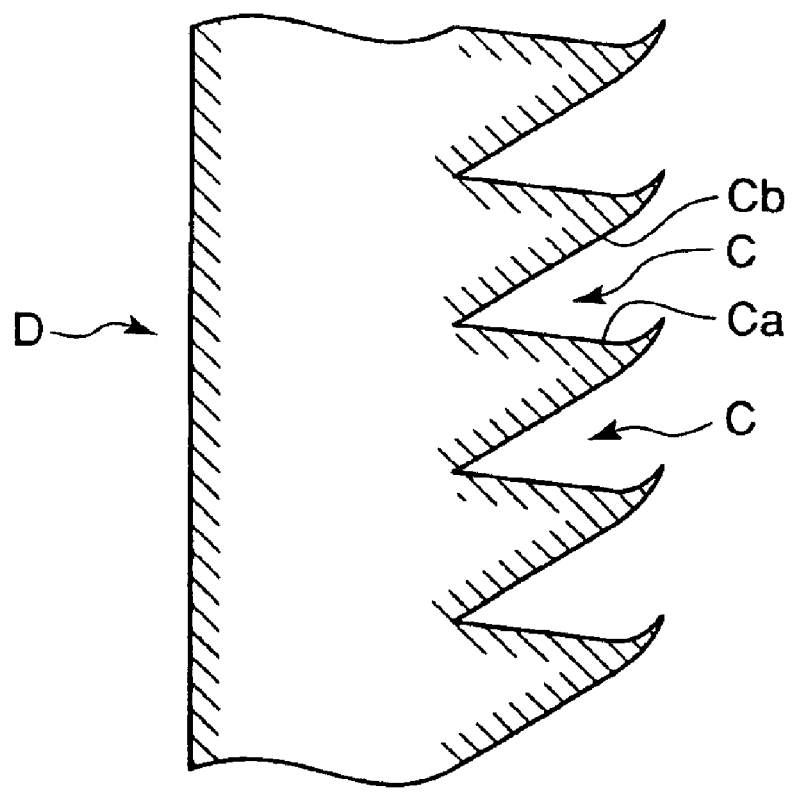
FIG. 19 is an illustration for explaining a conventional mold for use in the molding of a Fresnel lens sheet.
Figure 20A:
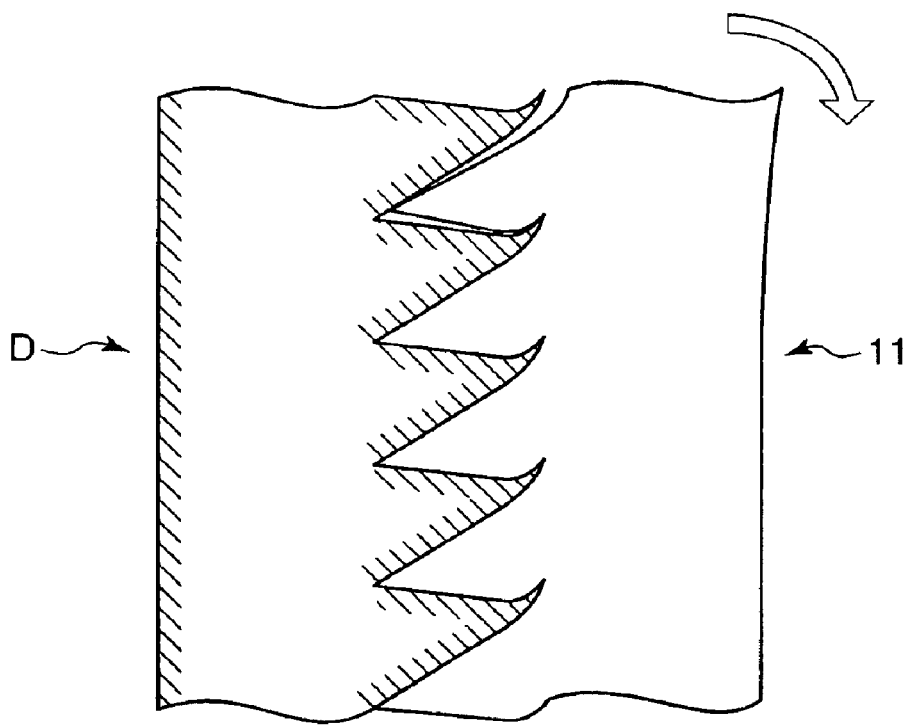
FIG. 20A is an illustration for explaining the problems that occur when a Fresnel lens sheet is molded by the use of the mold shown in FIG. 19.
Figure 20B:
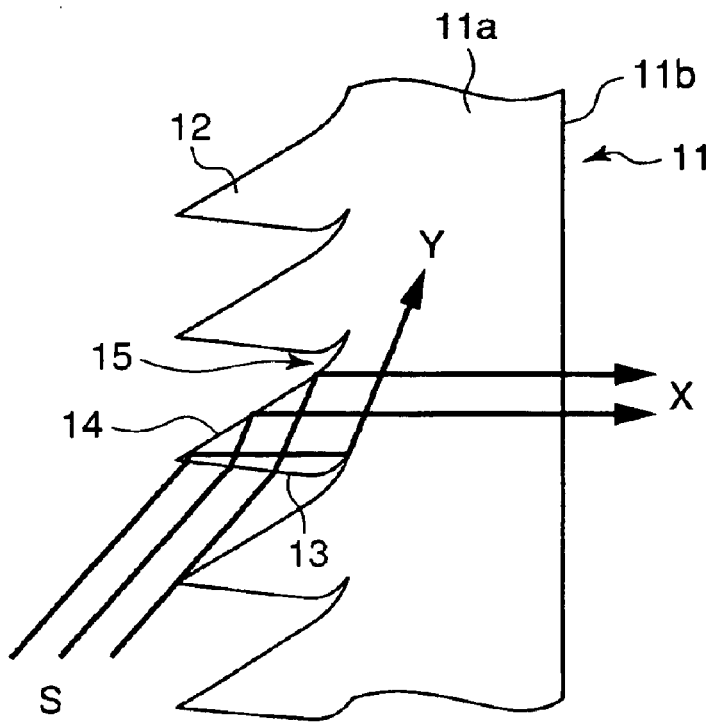
FIG. 20B is an illustration for explaining the problems that occur upon use of a Fresnel lens sheet molded by the use of the mold shown in FIG. 19.

As shown in FIG. 16, a rear projection screen 21 according to this embodiment comprises the Fresnel lens sheet 1 and a lenticular lens sheet (light-diffusing sheet) 22 provided on the emergent side (viewer's side) of the Fresnel lens sheet 1. The lenticular lens sheet 22 has linear lenses with half-elliptic cross sections 23, extending vertically on its incident side; on the surfaces of these lenses with half-elliptic cross sections 23 is formed a light-absorbing layer 24; and a diffusing agent 25 is dispersed in the lenses with half-elliptic cross sections 23.

The rear projection screen 21 of the above-described construction transmits light (imaging light) S projected from a projector 30 that is placed below the screen 21 on its incident side, thereby displaying an image to viewers. At this time, as mentioned previously, the Fresnel lens sheet 1 according to this embodiment never produces stray light, or even if it produces stray light, the amount of the stray light produced is small, so that the image displayed on the rear projection screen 21 is uniform in brightness over the entire screen and that the image does not undergo deterioration by double image or the like.

In the rear projection screen 21, not only the lenticular lens sheet 22 but also any other lenticular lens sheet may be used. Moreover, in place of the lenticular lens sheet 22, a light-diffusing sheet having a light-diffusing element, other than a lenticular lens sheet, may be used, and even in this case, the same effects can be obtained.

Other Embodiments

The above embodiment has been described with reference to the case where a mold D is made from a material M for the mold D by means of cutting and a Fresnel lens sheet 1 is molded by the use of this mold D. The present invention is not limited to this, and the following manner may also be adopted: a mold is reproduced from a master mold that has been made from a mold material by cutting, and a Fresnel lens sheet 1 is molded by the use of the mold that has been made in this manner.

In this case, a mold material is firstly cut into the shape that corresponds to the shape of a Fresnel lens sheet, thereby making a master mold that is the original of a mold for use in the molding of the Fresnel lens sheet. In this process, the angular protrusions of the master mold are made to curve toward the light-source side as in the mold D according to the aforementioned embodiment.

Thereafter, a first layer of nickel or the like is formed on the surface of the master mold by electroforming, for example. This first layer is separated from the master mold to be a mother mold. A second layer of nickel or the like is then formed on the surface of the mother mold by electroforming, for example. This second layer is separated from the mother mold and is, if necessary, backed to be a mold.

The shape of the mold made in this manner becomes the same as that of the master mold, so that the angular protrusions of the mold are curved to the light-source side as in the mold D according to the above-described embodiment.

Therefore, when a Fresnel lens sheet is molded by the use of the mold made in the above-described manner, it is possible to easily release the Fresnel lens sheet, molded product, from the mold like in the case of the above-described embodiment. Further, the Fresnel lens sheet molded by the use of the mold that has been made in the above-described manner can reduce the production of stray light as in the case of the aforementioned embodiment. Furthermore, since a mold is reproduced from the master mold, it is possible to easily make a plurality of molds and to produce a Fresnel lens sheet with ease.

Moreover, it is, of course, possible to assemble a rear projection screen as shown in FIG. 16 by the use of the Fresnel lens sheet molded by the use of the mold that has been made in the above-described manner. Even in this case, there can be obtained the same actions and effects as those of the above-described embodiment.

EXAMPLES

Example

By the use of a Fresnel lens sheet and a lenticular lens sheet as described under the following (1) and (2), respectively, a rear projection screen with a screen size of 50 inches was assembled as a rear projection screen of Example. A projector was then placed at the center, in the horizontal direction, of the rear projection screen, 312 mm below the lower edge of the rear projection screen, and 400 mm distant, in the normal direction, from the rear projection screen, and imaging light (projected light) was projected on the rear projection screen from this projector.

(1) Fresnel Lens Sheet

A Fresnel lens sheet having, on the plane of incidence of a base in sheet form, a plurality of prisms in the shape of circular arcs with a pitch of 0.11 mm, each prism having a plane of refraction and a plane of total reflection, was prepared as a Fresnel lens sheet of Example. These prisms were disposed around the center of concentric circles that was present at the center, in the horizontal direction, of the rear projection screen, 312 mm below the lower edge of the rear projection screen. The radius of the prism with a minimum radius was, therefore, 312 mm, and that of the prism with a maximum radius was 1188 mm.

In the molding of the above Fresnel lens sheet was used a mold that had been made by successively cutting, with a cutting tool, molding grooves in a mold material, from a molding groove that corresponded to the prism with a radius of 312 mm, to a molding groove that corresponded to the prism with a radius of 1188 mm. All of the angular protrusions of the mold therefore curved toward the light-source side. More specifically, the angular protrusions created between the molding grooves that had been cut in the stage that the cutting tool was still sharp (those molding grooves that corresponded to the prisms with radii of 312 to 500 mm) curved slightly to the light-source side, and the angular protrusions created between the molding grooves that had been cut in the later stage (those molding grooves that corresponded to the prisms with radii of 500 to 1188 mm) curved to the light-source side at an increasing inclination. The Fresnel lens sheet molded by the use of this mold was that the roots between the prisms were curved in conformity with the curves of the angular protrusions of the mold.

Since the mold in which the angular protrusions were curved toward the light-source side was used in the molding of the Fresnel lens sheet, it was possible to release the Fresnel lens sheet smoothly from the mold.

(2) Lenticular Lens Sheet

A lenticular lens sheet having linear lenses with half-elliptic cross sections that extended vertically (in the longitudinal direction) on its plane of incidence with a pitch of 0.143 mm was prepared as a lenticular lens sheet of Example. The thickness of the lenticular lens sheet was made 1 mm, and a diffusing agent was dispersed in the lenticular lens sheet in order to make the half angle of horizontal diffusion, 25° and the half angle of vertical diffusion, 10°. Further, a light-absorbing layer with a thickness of 20 $\mu$m was formed on the surfaces of the lenses with half-elliptic cross sections. The absorbance of the light-absorbing layer was made 40%.

A rear projection screen was assembled by the combination use of the above-described Fresnel and lenticular lens sheets. Imaging light was projected on this rear projection screen from the above-described projector, and the image projected on the rear projection screen was observed. The image was uniform in brightness over the entire rear projection screen and did not undergo deterioration by double image or like due to stray light; thus, the image was excellent.

Comparative Example

By the use of a Fresnel lens sheet and a lenticular lens sheet as described under the following (1) and (2), respectively, a rear projection screen with a screen size of 50 inches was assembled as a rear projection screen of Comparative Example. A projector was placed in the same position as that in the above-described Example, and imaging light (projected light) was projected on the rear projection screen from this projector.

(1) Fresnel Lens Sheet

A Fresnel lens sheet having, on the plane of incidence of a base in sheet form, a plurality of prisms in the shape of circular arcs with a pitch of 0.11 mm, each prism having a plane of refraction and a plane of total reflection, was prepared as a Fresnel lens sheet of Comparative Example. These prisms were disposed around the center of concentric circles that was present at the center, in the horizontal direction, of the rear projection screen, 312 mm below the lower edge of the rear projection screen. The radius of the prism with a minimum radius was, therefore, 312 mm, and that of the prism with a maximum radius was 1188 mm.

In the molding of the above Fresnel lens sheet was used a mold that had been made by successively cutting, with a cutting tool, molding grooves in a mold material, from a molding groove that corresponded to the prism with a radius of 1188 mm, to a molding groove that corresponded to the prism with a radius of 312 mm. All of the angular protrusions of the mold therefore curved to the counter-light-source side. The Fresnel lens sheet molded by the use of this mold was that the roots between the prisms were curved in conformity with the curves of the angular protrusions of the mold.

Since the Fresnel lens sheet was molded by the use of the mold in which the angular protrusions were curved to the counter-light-source side, it was difficult to release the Fresnel lens sheet from the mold. Further, when or after releasing the Fresnel lens sheet from the mold, the resin cracked, and a part of the prisms on the Fresnel lens sheet came off. Moreover, the mold bent after the Fresnel lens sheet had been released from the mold.

(2) Lenticular Lens Sheet

The same lenticular lens sheet as that of the above-described Example was used.

A rear projection screen was assembled by the combination use of the above-described Fresnel and lenticular lens sheets. Imaging light was projected on this rear projection screen from the above-described projector, and the image projected on the rear projection screen was observed. Defects were found on the image at the points at which the prisms had came off, and the occurrence of double image due to stray light was confirmed.

What is claimed is:

1. A Fresnel lens sheet that condenses imaging light obliquely projected from a projector to let the light emerge toward a viewer's side as nearly parallel rays, comprising:
   a base in sheet form; and
   a plurality of prisms formed on an incident side of the base, each of the prisms having a plane of refraction that refracts projected light and a plane of total reflection that totally reflects, toward the viewer's side, at least part of the light refracted at the plane of refraction,
   wherein each root defined by the plane of refraction of one prism among a plurality of the prisms and the plane of total reflection of another prism, the another prism being situated next to the one prism on the side of the plane of refraction of the one prism, is curved toward the another prism side from the one prism side.

2. The Fresnel lens sheet according to claim 1, wherein, in a cross section of each of the prisms vertical to its edge, a distance of shift, due to curve, of an end of the root is not more than 20% of a prism pitch.

3. The Fresnel lens sheet according to claim 1, wherein, in a cross section of each of the prisms vertical to its edge, a distance of shift, due to curve, of an end of the root is not more than 15% of the prism pitch.

4. The Fresnel lens sheet according to claim 1, wherein, in a cross section of each of the prisms vertical to its edge, a length of the curved portion of the plane of refraction of the root and that of the curved portion of the plane of total reflection of the root are not more than 40% of a total length of the plane of refraction and of a total length of the plane of total reflection, respectively.

5. The Fresnel lens sheet according to claim 1, wherein, in a cross section of each of the prisms vertical to its edge, a length of the curved portion of the plane of refraction of the root and that of the curved portion of the plane of total reflection of the root are not more than 30% of a total length of the plane of refraction and of a total length of the plane of total reflection, respectively.

6. A rear projection screen comprising:
   a Fresnel lens sheet as set forth in claim 1; and
   a light-diffusing sheet placed on a viewer's side of the Fresnel lens sheet.

* * * * *